(12) United States Patent
Giri et al.

(10) Patent No.: US 12,013,868 B2
(45) Date of Patent: Jun. 18, 2024

(54) SYSTEMS AND METHODS FOR QUANTIFYING SAVED TIME

(71) Applicant: INTUIT INC., Mountain View, CA (US)

(72) Inventors: Neha Giri, Mississauga (CA); Neha Kumari, Mountain View, CA (US); Elangovan Shanmugam, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 8 days.

(21) Appl. No.: 17/508,853

(22) Filed: Oct. 22, 2021

(65) Prior Publication Data

US 2023/0126845 A1 Apr. 27, 2023

(51) Int. Cl.
*G06F 16/25* (2019.01)
*G06F 11/34* (2006.01)
*G06F 16/2453* (2019.01)
*G06Q 40/12* (2023.01)

(52) U.S. Cl.
CPC ........ *G06F 16/254* (2019.01); *G06F 11/3423* (2013.01); *G06F 11/3438* (2013.01); *G06F 16/24549* (2019.01); *G06F 16/252* (2019.01); *G06Q 40/123* (2013.12)

(58) Field of Classification Search
CPC ............. G06F 16/254; G06F 16/24549; G06F 16/252; G06F 11/3423; G06F 11/3438; G06Q 40/123
USPC ........................................................ 707/602
See application file for complete search history.

(56) References Cited

U.S. PATENT DOCUMENTS

| | | | |
|---|---|---|---|
| 2005/0090911 A1* | 4/2005 | Ingargiola | G06Q 40/06 700/47 |
| 2010/0145902 A1* | 6/2010 | Boyan | G06F 16/958 715/810 |
| 2015/0154171 A1* | 6/2015 | Jensen | G06F 40/174 715/224 |
| 2015/0363384 A1* | 12/2015 | Williams | G06F 40/30 704/9 |
| 2019/0007440 A1* | 1/2019 | Lavi | G06Q 50/26 |
| 2021/0103865 A1* | 4/2021 | Anisingaraju | G06F 16/367 |

* cited by examiner

*Primary Examiner* — Hosain T Alam
*Assistant Examiner* — Saba Ahmed
(74) *Attorney, Agent, or Firm* — DLA Piper LLP (US)

(57) ABSTRACT

Systems and methods for quantifying saved time during data entry.

19 Claims, 9 Drawing Sheets

US 12,013,868 B2

SYSTEMS AND METHODS FOR QUANTIFYING SAVED TIME

BACKGROUND OF THE DISCLOSURE

In the field of accounting, taxes, and other fiscal-related tasks, many tools allow users to utilize automatic data import capabilities. For example, certain programs allow a user to import a W2 form from an employer or 109x tax information from a financial institution. The importation typically occurs via third-party APIs or through data extraction of images provided by the user. Such automatic data import capabilities take significantly less time than manual data entry methods (i.e., a user manually typing in all required tax values). However, a large segment of users do not use automatic data import capabilities. Such hesitancy can either be because the users do not know about the features, do not want to enter third party credentials (e.g., financial institution login information), do not understand the benefits of using automatic data import, or a combination of all three. Some users may also find entering credentials of third-party logins to be painstaking, causing them to just give up and use a manual data entry method. In other words, users often do not fully understand the scope of benefits offered by automatic data import capabilities, which is undesirable.

DETAILED DESCRIPTION OF SEVERAL EMBODIMENTS

Figure 1:
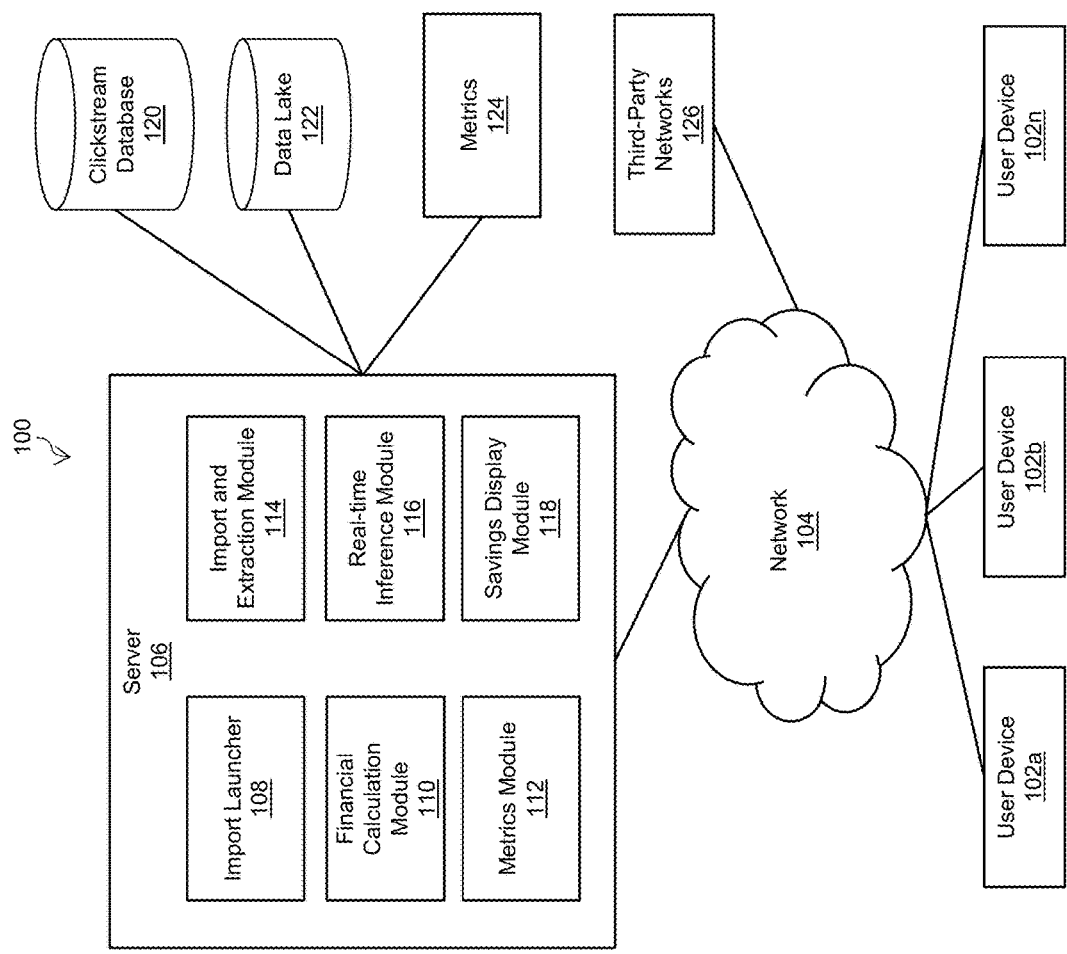
FIG. 1 is a block diagram of an example system for quantifying saved time according to some embodiments of the present disclosure.

Embodiments of the present disclosure relate to systems and methods for quantifying time saved, such as during data entry applications in tax, accounting, and other similar fiscal tools. For example, the disclosed principles can be applied to predict how much time would be saved if a user was to use an automatic data import functionality instead of manually entering data. In addition, the disclosed principles can be applied to predict how much time was lost by using a manual data entry method rather than an automatic import functionality. The system utilizes a machine learning algorithm that can provide personalized time estimates for a user for how long it will take to complete a certain data entry task, whether it be automatic or manual. The machine learning algorithm is trained based on various data from historical users entering data, such as clickstream data and other analytics. In addition, the machine learning algorithm is trained to tailor its predictions based on the types of forms that are being filled in (e.g., W2, 1099-INT, 1099-DIV, cryptocurrency transactions, etc.) and the complexity of the associated tax profile. The algorithmic implementation involves the analysis of the difference in time taken for data imported by customers using a given import/extraction method and average time it takes for a person to type in the same amount of details manually. The system can leverage analytics and data collected during various import/extraction methods to get an accurate time estimate.

Previous attempts at estimating time saved during similar data entry applications have not led to reliable or accurate results. In particular, many attempts have actually led to inconclusive or even counter-intuitive conclusions (i.e., improperly determining that manual entry would be quicker). For example, the technical shortcomings in these previous attempts are due to the techniques for measuring actual time taken were prone to inaccuracies because they simply measured how long it took for users to enter all data. It was too difficult to determine when to start and stop such a "stopwatch" across various entry methods, tax forms, and tax scenarios of varying complexity. Using such a technique to compile an estimation algorithm is prone to errors because it does not account for real-world human behavior, such as when users review their answers, get distracted, or even completely leave the process. These techniques involved substantial guesswork and were not personalized to specific users and specific data entry applications. Rather, they were behavioral tests that served as a generic attempt to estimate time-savings.

In other words, these previous attempts to measure the time difference are based on observing the time difference between events generated on the front end when a user is using manual entry and automated entry for filling in their data (e.g., W2 data for a tax application). But since there are a variety of factors that influence the time taken to populate W2 data, such a simple method of measuring the time difference in the observed times is insufficient to form the basis for predictive analysis. Any such time differences should be measured across similar use cases. For example, the time taken to manually enter W2 data in the case of multiple states will be more than the time taken to enter the same information for a single state. Therefore, the time saved in both scenarios for an automated import will be different. Accordingly, the disclosed systems and methods identify the applicable factors for a given user and match them to the right segment of users having similar factors to predict time differences more accurately.

The principles disclosed herein as described as being used for tax and or financial services by way of example and not limitation. It should be appreciated that the disclosed principles can be applied to other electronic services requiring user-entered data/information. FIG. 1 is a block diagram of an example system 100 for quantifying saved time according to some embodiments of the present disclosure. The system 100 can include a plurality of user devices 102a-n (generally referred to herein as a "user device 102" or collectively referred to herein as "user devices 102") and a server 106, which are communicably coupled via a network 104. In some embodiments, the system 100 can include any number of user devices. For example, for an organization that manages accounting software and an associated database, there may be an extensive userbase with thousands or even millions of users that connect to the system 100 via their user devices 102. Components of the system 100 can also communicate with one or more third-party networks 126 (e.g., financial networks) via the network 104. The server 106 can be configured to receive financial transaction information from the third-party networks 126 associated with the various users of user devices 102. For example, if the system is to be used for tax and or financial services, a user can, via its user device 102, connect his/her financial instruments (e.g., checking accounts, savings accounts, credit cards, investment accounts, etc.) to a planning tool (e.g., Credit Karma™, Mint™, QuickBooks®, etc.) so that financial and tax information is compiled on behalf of the user. Once the connection is defined, the server 106 can be authorized to obtain such information associated with the connected financial instruments from the third-party networks 126, such as tax forms and other types of documents (e.g., W2, 1099-INT, 1099-DIV, cryptocurrency transactions, etc.). In addition, the server 106 is communicably coupled to a various data stores, such as a clickstream database 120, a data lake 122, and a metrics database 124. The clickstream database 120 manages and stores clickstream data from the user devices 102 (e.g., from user manual entry time). The data lake 122 manages and stores analytics data for processes such as data importation (e.g., from third parties) and image extraction (e.g., uploaded images of paper documents). The metrics database 124 manages and stores behavioral and tax data associated with the userbase, such as whether a user is a single filer, a family filer, self-employed, and the like.

A user device 102 can include one or more computing devices capable of receiving user input, transmitting and/or receiving data via the network 104, and or communicating with the server 106. In some embodiments, a user device 102 can be a conventional computer system, such as a desktop or laptop computer. Alternatively, a user device 102 can be a device having computer functionality, such as a personal digital assistant (PDA), a mobile telephone, a smartphone, or other suitable device. In some embodiments, a user device 102 can be the same as or similar to the computing device 900 described below with respect to FIG. 9. In some embodiments, the system 100 can include any number of user devices 102.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 800 described below in the context of FIG. 8.

As shown in FIG. 1, the server 106 includes an import launcher 108, a financial calculation module 110, a metrics module 112, an import and extraction module 114, a real-time inference module 116, and a savings display module 118. The server 106 can access the various data stores (e.g., clickstream database 120, data lake 122, and metrics database 124) and the third-party networks 126 to obtain information necessary to estimate time savings for a particular user. A data lake can hold structured, semi-structured, or raw data from multiple sources, which can then be used and processed through analytics. Databases can generally refer to storage of data that an application or service uses for relevant data to accomplish specific use cases, but can also be structured or semi-structured.

The import launcher 108 is configured to, while a user is accessing a tax filing or other financial-type software via a user device 102, manage and display an import/upload page to the user that prompts the user to either import or upload certain information or forms (e.g., tax forms). For example, the import/upload page can be an interface in which the user can either manually upload a file from the user device 102 or navigate to a third-party financial institution via a third-party network 126 and import the required tax forms. The financial calculation module 110 is configured to process a tax return for a user based on received financial information.

The metrics module 112 is configured to access the clickstream database 120, the data lake 122, and the metrics database 124 to obtain information for a particular user's import/upload request. For example, the metrics module 112 obtains import method information from the data lake 122, information on the user's tax profile from the metrics database 124, form type information, and clickstream data from the clickstream database 120.

The import and extraction module 114 operates in conjunction with the import launcher 108 and is configured to accept imported documents (either uploaded from a user device 102 or imported from a third-party network 126) and extract the necessary data from the documents in preparation for the financial calculation module 110 to prepare a tax return. For example, the import and extraction module 114 can receive an image of a user's W2, extract information from the W2 (e.g., income, taxes paid, withholdings information, etc.), and transmit the information to the financial calculation module 110 for analysis and tax return preparation.

The real-time inference module 116 is configured to receive various metrics, user behavioral and tax information, and other analytics from the metrics module 112 and estimate the amount of time a user would save if he/she were to utilize an automated data importation technique instead of manually entering data. The real-time inference module 116 utilizes a machine learning algorithm trained on clickstream data, tax data, and other analytics data for data importation and extraction. Additional details on the machine learning algorithm and its training are discussed in relation to FIG. 2. The savings display module 118 is configured to receive time estimates from the real-time inference module 116, determine whether the user has already initiated a manual data entry or not, and cause various savings information to be displayed on a user device 102. Additional details on savings displays are discussed in relation to FIGS. 4-7.

Figure 2:
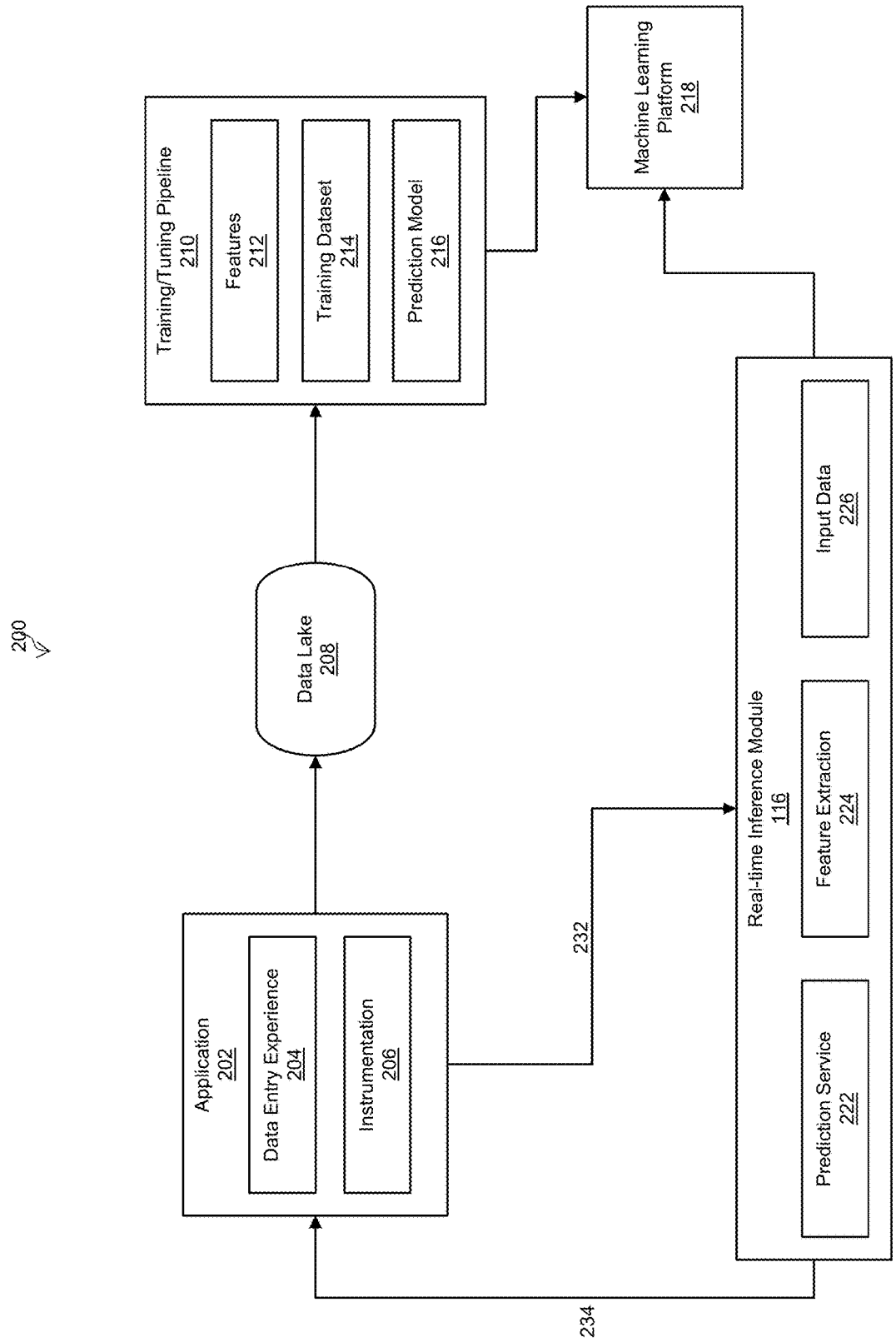
FIG. 2 is an example end-to-end system for quantifying saved time according to some embodiments of the present disclosure.

FIG. 2 is an example end-to-end system 200 for quantifying saved time according to some embodiments of the present disclosure. The system 200 can be implemented as part of the system 100 illustrated in FIG. 1. The application 202 runs on one or more user devices 102 and can be e.g., tax filing software or other similar financial-type software.

The application 202 includes a data entry experience 204 that provides a user various methods to enter various information necessary for tax filings and the like. The application 202 also includes instrumentation 206. In some embodiments, the instrumentation 206 can refer to functionality to capture logs to indicate start and stop times of a manual or automatic method of data entry. Additionally, the instrumentation 206 refers to the measure of a product's performance, to diagnose errors, and to write trace information. The application 202 is also operatively connected to a data lake 208, which can be the same as or similar to the data lake 122 in FIG. 1. In this manner, the application 202 can report analytics to be stored in the data lake 208, such as how long it takes for certain information to be imported from third-party networks (e.g., third-party networks 126) and how long it takes for data to be extracted from specific forms and documents.

The application 202 is also operatively connected to a real-time inference module 116, which can generate time estimations in real-time. The real-time inference module 116, as discussed above in relation to FIG. 1, is configured to receive various metrics, user behavioral and tax information, and other analytics from the metrics module 112 and estimate the amount of time a user would save if he/she were to utilize an automated data importation technique instead of manually entering data. The real-time inference module 116 includes a prediction service 222, a feature extraction service 224, and input data 226. The feature extraction service 224 is configured to extract features (to be defined in relation to the machine learning platform 218) from data received that is associated with a user request to enter data. Once features are extracted, they are provided to the prediction service 222, which can generate a time savings prediction via a machine learning algorithm. The machine learning algorithm is trained to make such predictions on various features associated with a user and the associated request to enter data. The input data service 226 receives inputs via data flow 232. For example, the input data service receives information such as household tax filing information, number of applicable W2's, number of states for filing, etc.

The data lake 208, which receives data reports and other analytics from the application 202 (and all other instances of application 202 that operate on the userbase of user devices 102), is configured to feed into a training/tuning pipeline 210, which is then used by a machine learning platform 218 to train the machine learning algorithm for use by the real-time inference module 116. In some embodiments, the machine learning platform 218 can be Amazon SageMaker or another machine learning service that allows for the building, training, and deploying of machine learning algorithms.

The training/tuning pipeline 210 includes a defined set of features 212, a training dataset 214, and a definition of a prediction model 216 based on the features 212 and the training dataset 214. These are passed to the machine learning platform 218, which trains the prediction model 216 and tunes its parameters to make predictions of time savings based on the features 212 and the training dataset 214. As a specific example, the model is trained to predict the total number of seconds a user would save if he/she decides to import a W2 instead of entering the values manually. Conversely, the model is trained to predict the total number of seconds a user would have saved if he/she would have imported a W2 instead of entering the values manually. In some embodiments, the training/tuning pipeline 210 can perform cleaning processes on the training dataset 214 to remove anomalies and bias. For example, in real life, a user may have left a browser window open for a long period of time. These types of data points would be removed from the training dataset 214.

The disclosed features 212 that the prediction module 216 is trained to analyze includes user clickstream behavior and their specific financial information. Features for a tax preparation service, for example, can include, but are not limited to, category of filing, employer name, address, W2 count, filing status, dependents count, number of state taxes, number of primary W2 fields, number of spousal W2 fields, number of dependents W2 fields, number of single states W2 fields, number of spousal states fields, total fields (i.e., total number of fields in a form), and time spent per form. The time spent per form is a feature that is to be predicted by the prediction module 216. In some embodiments, the features 212 used by the training/tuning pipeline may only include the length of the employer's name, the length of the employer's address, the number of W2's to enter, the filing status, the total number of state taxes in the filing, the total fields to be entered to complete the tax return, and the total time spent per form (target feature that is to be predicted). In addition, clickstream features can include user drop off from the form screen, the number of times a user drops off before finishing a form and submitting it, and the total amount of time taken to fill each field in a form. As described herein, "drop off" refers to a user making a change to a screen, causing a screen to become inactive on the application (e.g., via logging out), or stopping the tax preparation process.

In some embodiments, the prediction model 216 can be represented as a linear expression and can be trained via linear regression techniques. In such embodiments, the target feature (i.e., time to manually fill out a form) is represented as a linear sum of the other features (discussed above), where each feature is multiplied by a weight (i.e., regression coefficient). The training of the machine learning model by machine learning platform 218 involves regression techniques to calibrate these weight values. It is important to note that the disclosed training procedures are not limited to linear regression techniques and can use others, such as quadratic regression, support vector (SVM) regression with a linear kernel, default SVM regression, SVM regression with a radial basis function (RBF) kernel, a Random Forest Regressor, an XGBoost Regressor, etc. Additionally, the disclosed algorithms can further be tuned to achieve the desired results by adjusting the hyper tuning parameters. In some embodiments, the training can be performed with a factor of 0.3, where 70% of the randomized training dataset 214 is used for training and the remaining 30% is used for testing, although this is not limiting. In some embodiments, root mean squared error techniques can be used to measure the accuracy of outputs. In some embodiments, the training of the machine learning algorithm can also involve unsupervised learning. For example, a clustering algorithm can be run to group similar categories of users, and then additional can be derived from the resulting clusters. When a new user logs in and launches the application 202, they can be automatically assigned to a particular cluster.

During real-time use of the application 202 by a user, the real-time inference module 116 utilizes a deployed version of the trained machine learning model (i.e., a user device 102 is used as an endpoint for the model) in its prediction service 222 to calculate time savings for the user. The real-time inference module 116 receives user information via data flow 232, and the feature extraction service 224 extracts the features necessary to form an input to the prediction service 222. Then, the prediction service 222 provides an output of the predicted time via data flow 234.

Furthermore, the setup of system 200 allows for the consistent updating and re-tuning of the model via machine learning platform 218.

Figure 3:
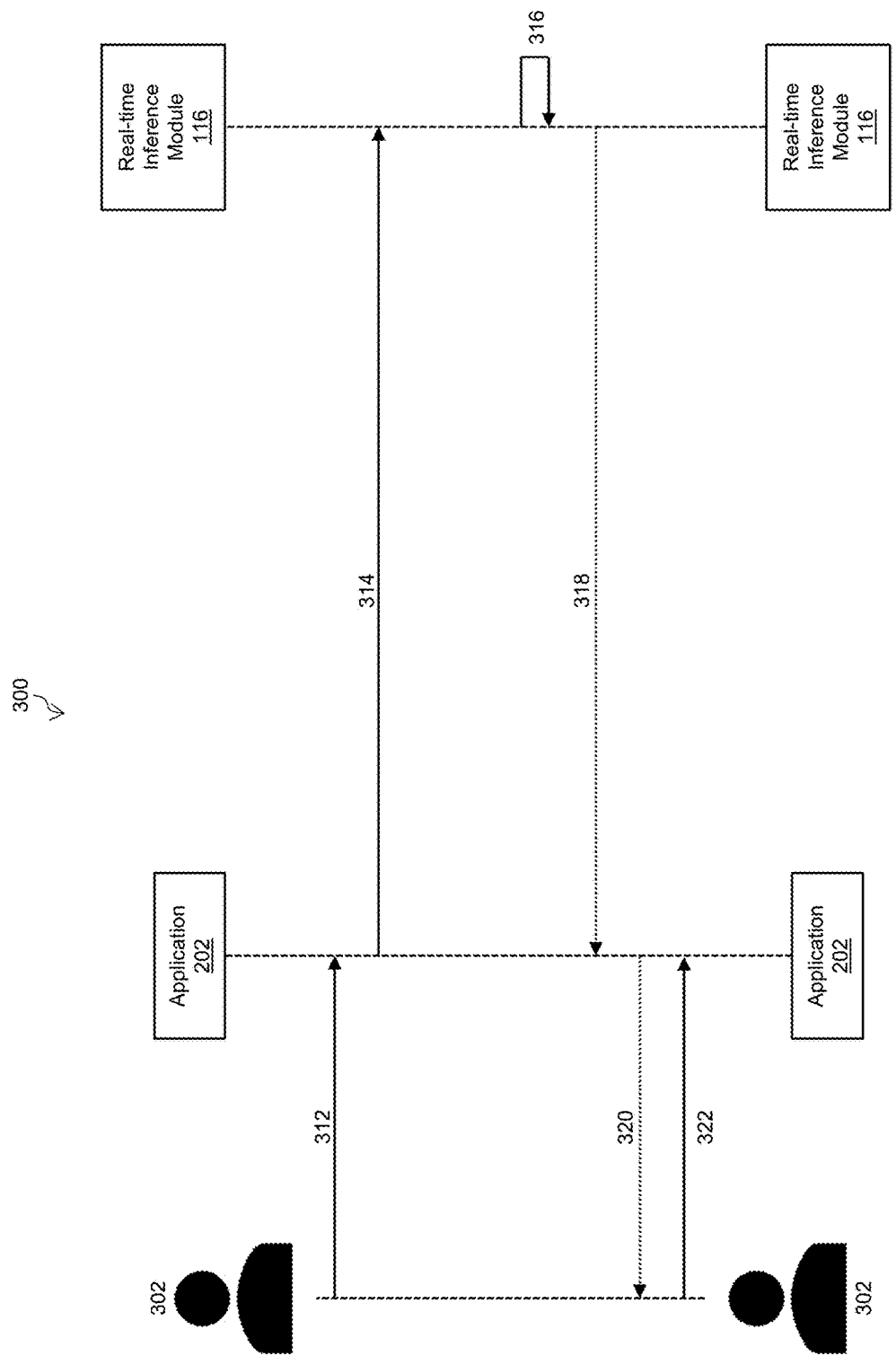
FIG. 3 is an example sequence diagram for quantifying saved time according to some embodiments of the present disclosure.

FIG. 3 is an example sequence diagram 300 for quantifying saved time according to some embodiments of the present disclosure. As described in the context of diagram 300, solid lines refer to method invocations or data accesses, while dotted lines refer to returns of data. In some embodiments, the sequence shown in diagram 300 can be implemented within system 100. A user 302 launches an import experience 312 via the application 202. The application can be accessed via a device associated with the user 302, such as one of user devices 102. The import experience 312 can be any page within a tax preparation or other software tool that prompts a user to enter information, such as a specific form or document. The user is typically given the option to either sign into a third-party platform via an API and import documents, upload images or file versions of the documents from their own device, or manually enter information. Once the import experience 312 has been launched, the application 202 connects to the real-time inference module 116 via data flow 314. Data flow 314 indicates the flow of information to the real-time inference module 116 for generating a time savings estimation on behalf of the user 302. The information transmitted to the real-time inference module 116 includes related metrics for importation methods, a user profile (i.e., identifying and tax-specific information that the user 302 has already entered into the application 202 at other pages), and an identifier of the specific form that is associated with the import experience 312 (e.g., W2, 1099-INT, 1099-DIV, etc.).

Once the information is received from the application 202 the real-time inference module 116 performs a computation 316. Performing the computation 316 involves obtaining behavioral clickstream statistics for the user 302 and data importation/extraction statistics. For example, importation statistics can include historical or other statistical information on the amount of time it takes to connect to a third-party (e.g., Wells Fargo) and import a tax form (e.g., a W2). Data extraction statistics can include historical or other statistical information on the amount of time it takes to extract the necessary values from a type of form. The computation 316 further involves using the trained machine learning algorithm (see FIGS. 1-2) to calculate an estimated time it would take the user 302 to (1) manually fill out the form; and (2) import the form from a third-party service and extract the necessary values from the form. Once the two estimations are completed, the real-time inference module 116 can determine the difference between the two values, which is the estimated time that would be saved. Then, via data flow 318, the real-time inference module transmits the estimated time savings value to the application 202, which is displayed to the user 302 at flow 320. Once this potential time savings is displayed to the user 302, the user 302 provides an indication at 322 of which data import method he/she has chosen and the remainder of the tax preparation process can be completed (e.g., via the financial calculation module 110 and the import and extraction module 114, should the user 302 select the automated import option).

Figure 4:
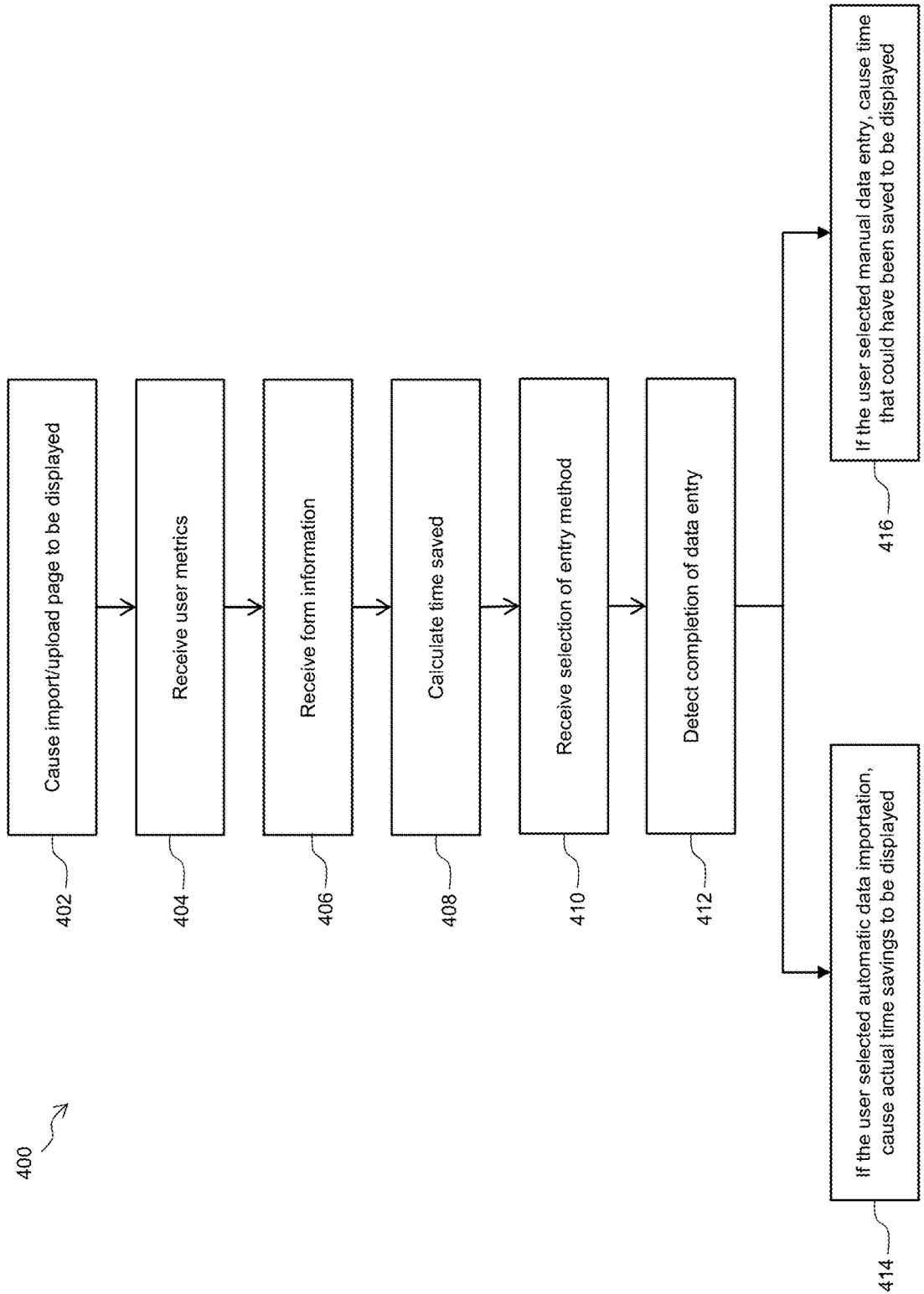
FIG. 4 is a flow diagram showing an example processing to quantify saved time according to some embodiments of the present disclosure.

FIG. 4 is a flow diagram showing an example process 400 to quantify saved time according to some embodiments of the present disclosure. In some embodiments, process 400 is performed within the system 100 of FIG. 1, such as by the server 106 and its various modules. At block 402, the import launcher 108 causes an import/upload page to be displayed on a user device 102. For example, the import/upload page can be displayed within a software application (e.g., the application 202), Web browser on the user device 102, Web applet, or similar application. At blocks 404 and 406, after the import/upload page has been displayed to the user, the metrics module 112 receives user metrics from the user device 102 (or from a database maintaining user metrics for the userbase). For a tax service, the metrics can include information on the user's tax profile (e.g., filing status, employer name, number of dependents, etc.) and an identifier of the associated tax form being filled out. Additionally, the metrics module 112 can access the clickstream database 120, the data lake 122, and the metrics database 124 to obtain clickstream data associated with the user and data importation and extraction analytics.

At block 408, the real-time inference module 116 calculates time saved for the particular user and particular form based on the information received at blocks 404 and 406. For example, the real-time inference module 116 can, via the feature extraction service 224, extract various features from the user profile and other received information to form a vector and/or set of features that serves as the input to the machine learning algorithm (see FIG. 2). Then, the prediction service 222 analyzes the feature vector with a machine learning algorithm (e.g., trained on the machine learning platform 218) to generate a time difference value, which is the estimated amount of time that would be saved were the user to use an automatic import tool instead of manual entry. The calculation step involves estimating, using clickstream data and the number of fields required for the specific document (among potential other features), an average amount of time it would take the user to manually enter all the required data. Additionally, the calculation step involves estimating, using analytics for data importation and extraction based on the third-party, clickstream data, and the number of fields required for the specific document (among potential other features), the amount of time it would take the user to enter all the required data using an automatic import technique. Then, the real-time inference module 116 determines the time difference between the two estimations, which is referred to herein as the "time savings."

At block 410, the savings display module 118 receives a selection of the user's desired data entry method. For example, the savings display module 118 may receive an indication that the user, via the user device 102, selected the manual data entry mode. Conversely, the savings display module 118 may receive an indication that the user, via the user device 102, selected the automatic data importation tool. At block 412, the savings display module 118 detects the completion of data entry by the user. At block 414, if the user had selected the automatic data importation tool, the savings display module 118 causes the actual estimated time savings to be displayed on the user device. Alternatively, at block 416, if the user had selected manual data entry, the savings display module 118 causes the estimated time that could have been saved to be displayed on the user device.

Figure 5:
FIG. 5 is an example user interface according to some embodiments of the present disclosure.

FIG. 5 is an example user interface 500 according to some embodiments of the present disclosure. The interface 500 is displayed after a user has chosen a data entry method (i.e., automatic or manual) and completed the entry process. Specifically, the interface 500 is an example interface that would be displayed to a user at block 414. The interface 500 can be displayed on a user device 102, such as within an application 202, on a Web browser, a Web applet, and the like. The interface 500 includes a review of the information that was imported, including employer information 501 and employee information 502. Additionally, the interface 500 may include a time savings display 503, which includes the time savings value (7 minutes in the illustrated example) that was determined by the real-time inference module 116.

Figure 6:
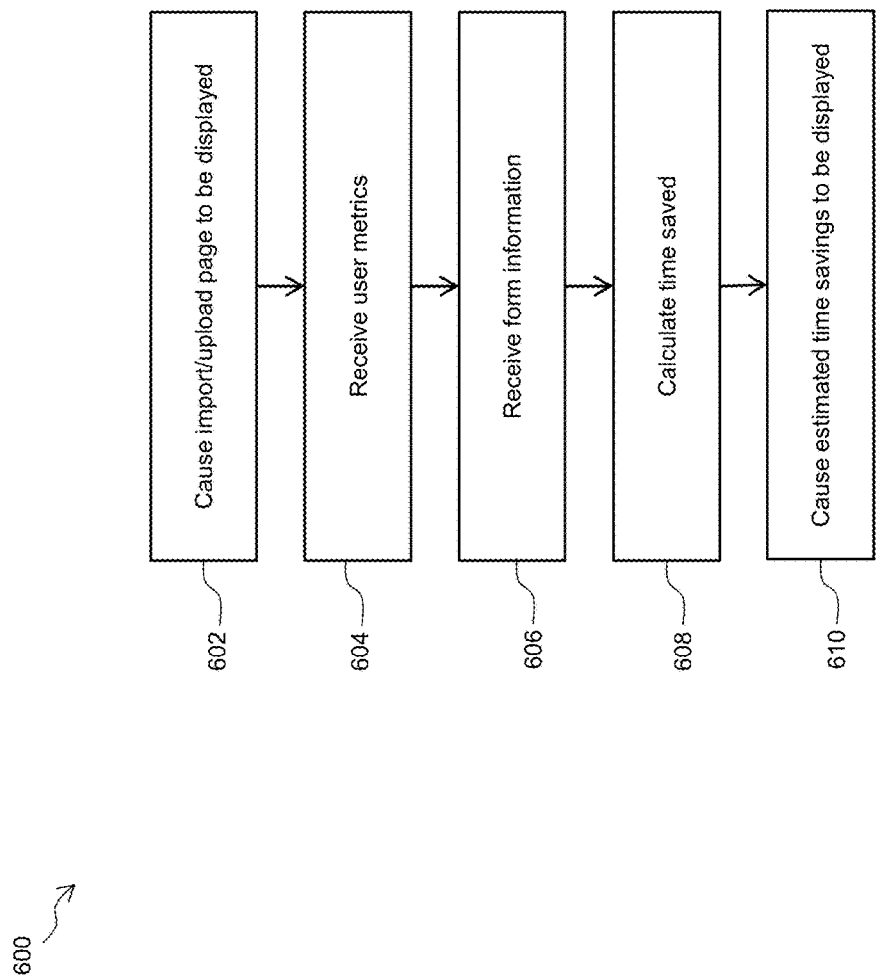
FIG. 6 is another flow diagram showing an example processing to quantify saved time according to some embodiments of the present disclosure.

FIG. 6 is another flow diagram showing an example process 600 to quantify saved time according to some embodiments of the present disclosure. In some embodiments, process 600 is performed within the system 100 of FIG. 1, such as by the server 106 and its various modules. Process 600 can be similar to process 400, except that the display of the time savings occurs prior to completion of data entry for a particular form. At block 602, the import launcher 108 causes an import/upload page to be displayed on a user device 102. At blocks 604 and 606, after the import/upload page has been displayed to the user, the metrics module 112 receives user metrics from the user device 102 (or from a database maintaining user metrics for the userbase). For a tax service, user metrics can include information on the user's tax profile (e.g., filing status, employer name, number of dependents, etc.) and an identifier of the associated tax form being filled out. Additionally, the metrics module 112 can access the clickstream database 120, the data lake 122, and the metrics database 124 to obtain clickstream data associated with the user and data importation and extraction analytics.

At block 608, similar to block 408, the real-time inference module 116 calculates time saved for the particular user and particular form based on the information received at blocks 604 and 606. For example, the real-time inference module 116 can, via the feature extraction service 224, extract various features from the user profile and other received information to form a vector and/or set of features that serves as the input to the machine learning algorithm (see FIG. 2). Then, the prediction service 222 analyzes the feature vector with a machine learning algorithm (e.g., trained on the machine learning platform 218) to generate a time difference value, which is the estimated amount of time that would be saved were the user to use an automatic import tool instead of manual entry. The calculation step involves, similar to block 408, estimating, using clickstream data and the number of fields required for the specific document (among potential other features), an average amount of time it would take the user to manually enter all the required data. Additionally, the calculation step involves estimating, using analytics for data importation and extraction based on the third-party, clickstream data, and the number of fields required for the specific document (among potential other features), the amount of time it would take the user to enter all the required data using an automatic import technique. Then, the real-time inference module 116 determines the time savings. At block 610, the savings display module 610 causes the estimated time savings to be displayed on user device 102.

Figure 7:
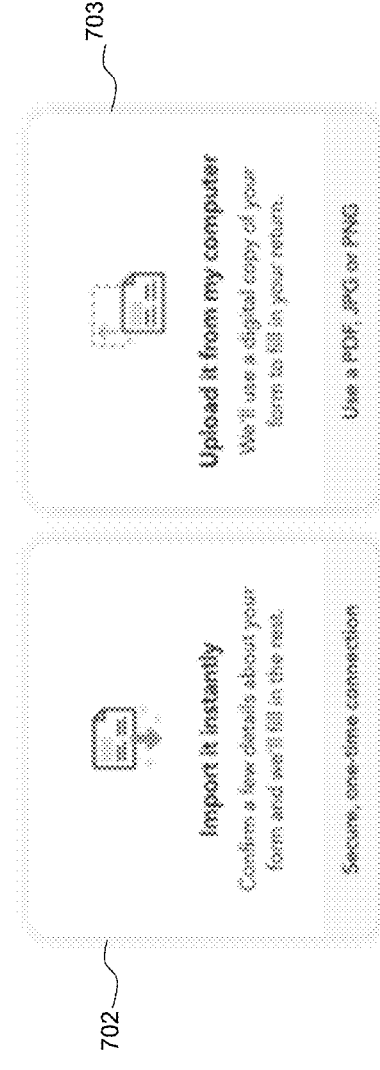
FIG. 7 is another example user interface according to some embodiments of the present disclosure.

FIG. 7 is an example user interface 700 according to some embodiments of the present disclosure. The interface 700 is displayed before a user has chosen a data entry method (i.e., automatic or manual) and begins the data entry process. Specifically, the interface 700 is an example interface that would be displayed to a user at block 610. The interface 700 can be displayed on a user device 102, such as within an application 202, on a Web browser, a Web applet, and the like. In the illustrated example, the interface 700 includes a user prompt 701 that asks the user how he/she wants to enter their W-2 information. It should be noted that this interface 700 can be adapted for other types of forms, such as 1099 forms, cryptocurrency transaction forms, and the like suitable for the system's service. The illustrated interface 700 also includes various options for filling in the W-2 forms, such as (1) an import option 702, which allows the user to import the W-2 by connecting to a third-party network; (2) an upload option 703, which allows the user to upload a file version of the W-2 from his/her computer; and (3) a manual option 705, which allows the user to fill in all fields for the W-2 manually. The interface 700 also includes a savings display 704, which shows the time that is estimated to be saved (10 minutes) if the user uses an automatic import feature instead of a manual option. Finally, the interface 700 includes a continue button 706, which allows the user to continue through the workflow of the application.

Figure 8:
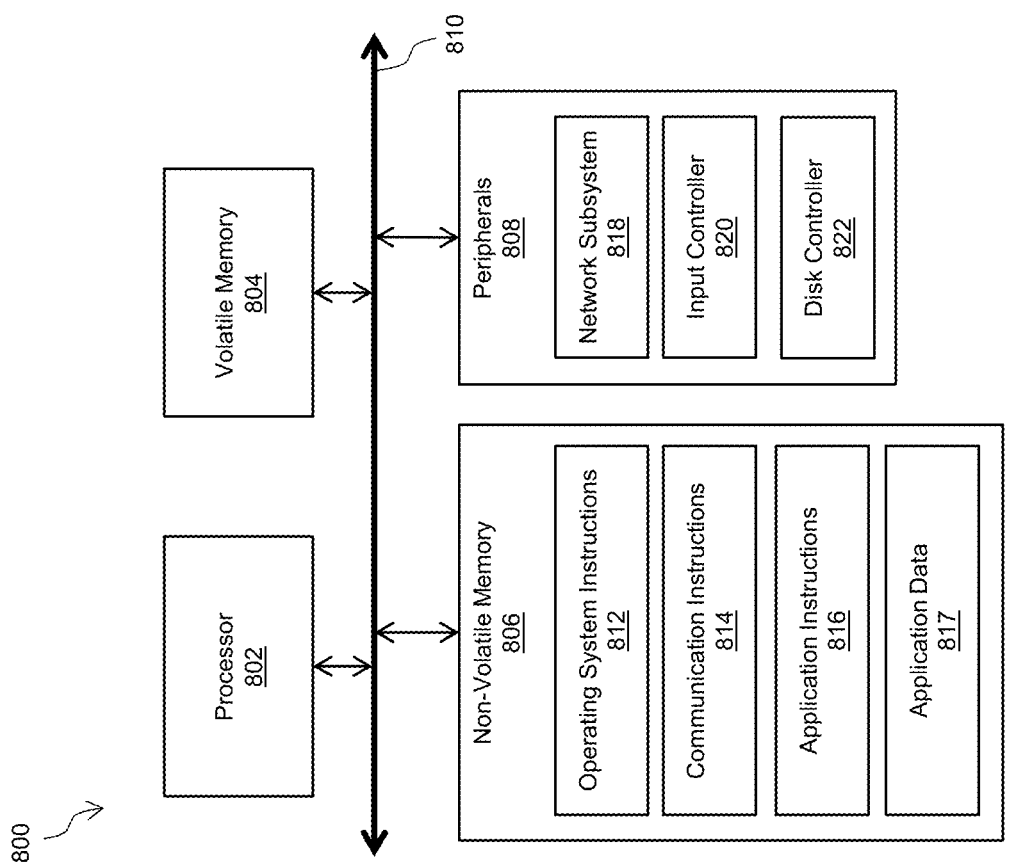
FIG. 8 is a server that can be used within the system of FIG. 1 according to an embodiment of the present disclosure.

FIG. 8 is a diagram of an example server device 800 that can be used within system 100 of FIG. 1. The server device 800 can implement various features and processes as described herein. The server device 800 can be implemented on any electronic device that runs software applications derived from complied instructions, including without limitation personal computers, servers, smart phones, media players, electronic tablets, game consoles, email devices, etc. In some implementations, the server device 800 includes one or more processors 802, volatile memory 804, non-volatile memory 806, and one or more peripherals 808. These components can be interconnected by one or more computer buses 810.

The processor(s) 802 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 810 can be any known internal or external bus technology, including but not limited to ISA, EISA, PCI, PCI Express, USB, Serial ATA, or FireWire. The volatile memory 804 can include, for example, SDRAM. Each processor 802 can receive instructions and data from a read-only memory or a random access memory or both. Essential elements of a computer can include a processor for executing instructions and one or more memories for storing instructions and data.

The non-volatile memory 806 can include by way of example semiconductor memory devices, such as EPROM, EEPROM, and flash memory devices; magnetic disks such as internal hard disks and removable disks; magneto-optical disks; and CD-ROM and DVD-ROM disks. The non-volatile memory 806 can store various computer instructions including operating system instructions 812, communication instructions 814, application instructions 816, and application data 817. The operating system instructions 812 can include instructions for implementing an operating system (e.g., Mac OS®, Windows®, or Linux). The operating system can be multi-user, multiprocessing, multitasking, multithreading, real-time, and the like. The communication instructions 814 can include network communications instructions, for example, software for implementing communication protocols, such as TCP/IP, HTTP, Ethernet, telephony, etc. The application instructions 816 can include instructions quantifying saved time according to the systems and methods disclosed herein. For example, the application instructions 816 can include instructions for the components 108-118 described above in conjunction with FIG. 1. The application data 817 can include data corresponding to the components 108-118 described above in conjunction with FIG. 1.

The peripherals 808 can be included within the server device 800 or operatively coupled to communicate with the server device 800. The peripherals 808 can include, for example, network subsystem 818, input controller 820, and disk controller 822. The network subsystem 818 can include, for example, an Ethernet of WiFi adapter. The input controller 820 can be any known input device technology, including but not limited to a keyboard (including a virtual keyboard), mouse, track ball, and touch-sensitive pad or display. The disk controller 822 can include one or more mass storage devices for storing data files; such devices include magnetic disks, such as internal hard disks and removable disks; magneto-optical disks; and optical disks.

Figure 9:
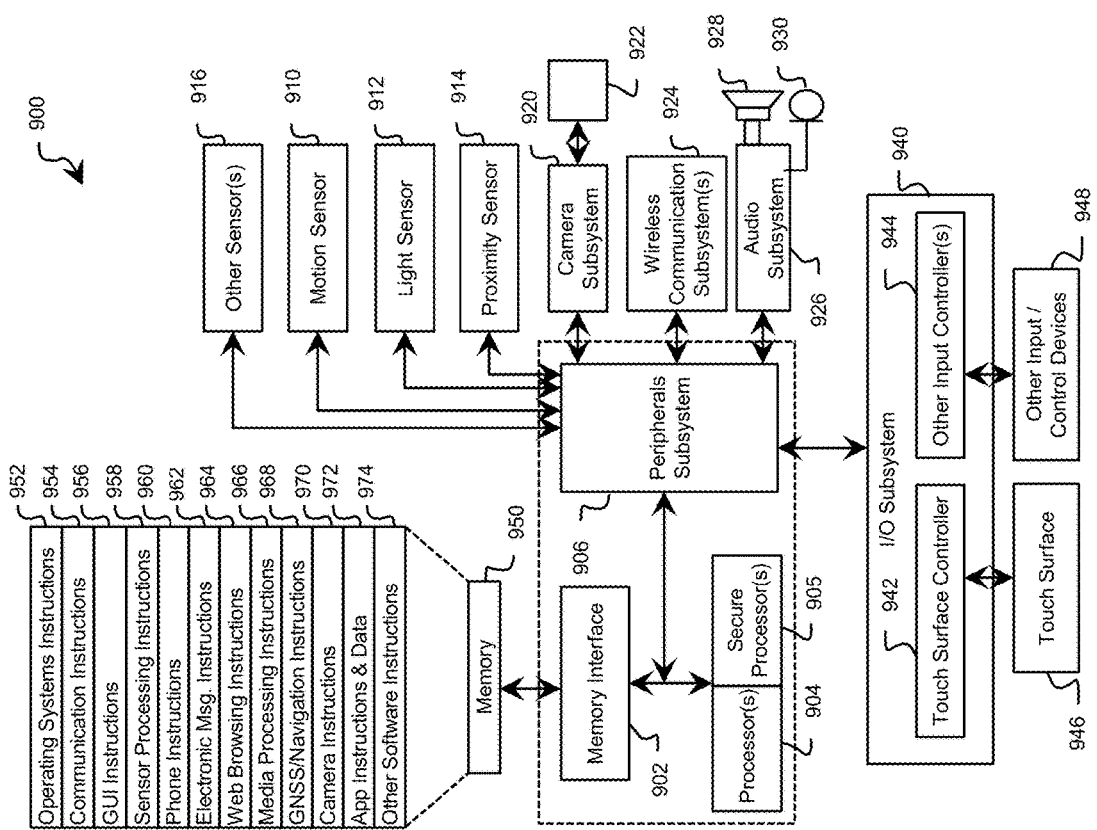
FIG. 9 is an example computing device that can be used within the system of FIG. 1 according to an embodiment of the present disclosure.

FIG. 9 is an example computing device that can be used within the system 100 of FIG. 1, according to an embodiment of the present disclosure. In some embodiments, the device 900 can be any of the user devices 102a-n. The illustrative user device 900 can include a memory interface 902, one or more data processors, image processors, central processing units 904, and/or secure processing units 905, and a peripherals subsystem 906. The memory interface 902, one or more central processing units 904 and/or secure processing units 905, and/or peripherals subsystem 906 can be separate components or can be integrated in one or more integrated circuits. The various components in user device 900 can be coupled by one or more communication buses or signal lines.

Sensors, devices, and subsystems can be coupled to the peripherals subsystem 906 to facilitate multiple functionalities. For example, a motion sensor 910, light sensor 912, and proximity sensor 914 can be coupled to peripherals subsystem 906 to facilitate orientation, lighting, and proximity functions. Other sensors 916 can also be connected to the peripherals subsystem 906, such as a global navigation satellite system (GNSS) (e.g., GPS receiver), a temperature sensor, a biometric sensor, magnetometer, or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wired and/or wireless communication subsystems 924, which can include radio frequency receivers and transmitters and/or optical (e.g., infrared) receivers and transmitters. For example, the Bluetooth (e.g., Bluetooth low energy (BTLE)) and/or WiFi communications described herein can be handled by the wireless communication subsystems 924. The specific design and implementation of the communication subsystems 924 can depend on the communication network(s) over which the user device 900 is intended to operate. For example, the user device 900 can include a communication subsystems 924 designed to operate over a GSM network, a GPRS network, an EDGE network, a WiFi or WiMax network, and a Bluetooth™ network. In another example, the wireless communication subsystems 924 can include hosting protocols such that the user device 900 can be configured as a base station for other wireless devices and/or to provide a WiFi service.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voice-printing, and voice authentication, for example.

An I/O subsystem 940 can include a touch-surface controller 942 and/or other input controller(s) 944. The touch-surface controller 942 can be coupled to a touch-surface 946. The touch-surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch-surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for a volume control of speaker 928 and/or a microphone 930.

In some implementations, a pressing of the button for a first duration can disengage a lock of the touch-surface 946; and a pressing of the button for a second duration that is longer than the first duration can turn power to the user device 900 on or off. Pressing the button for a third duration can activate a voice control, or voice command, module that enables the user to speak commands into microphone 930 to cause the device to execute the spoken command. The user can customize a functionality of one or more of the buttons. The touch-surface 946 can, for example, also be used to implement virtual or soft buttons and/or a keyboard.

In some implementations, the user device 900 can present recorded audio and/or video files, such as MP3, AAC, and MPEG files. In some implementations, the user device 900 can include the functionality of an MP3 player, such as an iPod™. The user device 900 can, therefore, include a 36-pin connector and/or 8-pin connector that is compatible with the iPod. Other input/output and control devices can also be used.

The memory interface 902 can be coupled to a memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, Windows, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic messaging-related process and functions; web browsing instructions 964 to facilitate web browsing-related processes and functions; media processing instructions 966 to facilitate media processing-related functions and processes; GNSS/Navigation instructions 968 to facilitate GNSS and navigation-related processes and instructions; and/or camera instructions 970 to facilitate camera-related processes and functions.

The memory 950 can store application (or "app") instructions and data 972, such as instructions for the apps described above in the context of FIGS. 1-7. The memory 950 can also store other software instructions 974 for various other software applications in place on the user device 900.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings. Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method of quantifying saved time performed by at least one processor, said method comprising:
    causing an interface to be displayed on a user device, the interface comprising a first option for a user to manually enter data into a form and a second option to import or upload data into the form;
    receiving user metrics information from a database;
    receiving import and extraction statistical information from a data lake;
    receiving identifying information for the form from the user device; and
    calculating, via a machine learning algorithm, a time savings for using the second option instead of the first option based on the user metrics information, the import and extraction statistical information, and the identifying information for the form, wherein calculating the time savings comprises:
        extracting, via a feature extraction service, a plurality of features from the user metrics information, the import and extraction statistical information, and the identifying information for the form to form an input vector, wherein the input vector comprises a weight for each feature;

providing the input vector to the machine learning algorithm; and calculating the saved time with the machine learning algorithm based on the plurality of features.

2. The method of claim 1 comprising:

receiving, from the user device, a selection of the first option or the second option;

detecting a completion of data entry for the form; and causing the time savings to be displayed on the interface.

3. The method of claim 2, wherein causing the time savings to be displayed on the user device comprises, in response to receiving a selection of the first option and detecting the completion of data entry for the form, further causing a message to be displayed on the interface that indicates the saved time could have been saved.

4. The method of claim 2, wherein causing the saved time to be displayed on the user device comprises, in response to receiving a selection of the second option and detecting the completion of data entry for the form, further causing a message to be displayed on the interface that indicates the saved time was saved.

5. The method of claim 1, wherein receiving the user metrics information comprises receiving historical clickstream data from a plurality of other users.

6. The method of claim 1, wherein receiving the user metrics information comprises receiving financial information associated with the user.

7. The method of claim 1, wherein receiving the user metrics information comprises receiving financial and tax information associated with the user.

8. The method of claim 1, wherein receiving the import and extraction statistical information comprises receiving:

analytics on lengths of time to access and obtain information from a plurality of third-party networks; and analytics on lengths of time to extract information from files uploaded from the user device.

9. The method of claim 1, wherein calculating the saved time with the machine learning algorithm based on the plurality of features comprises:

calculating a first estimated time to fill out the form based on the first option;

calculating a second estimated time to fill out the form based on the second option; and calculating a difference between the first and second estimated times.

10. A system comprising:

a processor; and a non-transitory computer-readable medium storing instructions that, when executed by the processor, causes the processor to perform a method of quantifying saved time comprising:

causing an interface to be displayed on a user device, the interface comprising a first option for a user to manually enter data into a form and a second option to import or upload data into the form;

receiving user metrics information from a database;

receiving import and extraction statistical information from a data lake;

receiving identifying information for the form from the user device;

calculating, via a machine learning algorithm, a time savings for using the second option based on the user metrics information, the import and extraction statistical information, and the identifying information for the form;

receiving, from the user device, a selection of the first option or the second option via the user interface;

detecting a completion of data entry for the form;

causing the time savings to be displayed on the interface; and re-training the machine learning algorithm based on the completion of data entry.

11. The system of claim 10, wherein causing the time savings to be displayed on the user device comprises, in response to receiving a selection of the first option and detecting the completion of data entry for the form, further causing a message to be displayed on the interface that indicates the saved time could have been saved.

12. The system of claim 10, wherein causing the saved time to be displayed on the user device comprises, in response to receiving a selection of the second option and detecting the completion of data entry for the form, further causing a message to be displayed on the interface that indicates the saved time was saved.

13. The system of claim 10, wherein receiving the user metrics information comprises receiving historical clickstream data from a plurality of other users.

14. The system of claim 10, wherein receiving the user metrics information comprises receiving financial information associated with the user.

15. The system of claim 10, wherein receiving the user metrics information comprises receiving financial and tax information associated with the user.

16. The system of claim 10, wherein receiving the import and extraction statistical information comprises receiving:

analytics on lengths of time to access and obtain information from a plurality of third-party networks; and analytics on lengths of time to extract information from files uploaded from the user device.

17. The system of claim 10, wherein calculating the saved time comprises:

extracting, via a feature extraction service, a plurality of features from the user metrics information, the import and extraction statistical information, and the identifying information for the form to form an input vector, wherein the input vector comprises a weight for each feature;

providing the input vector to the machine learning algorithm; and calculating the saved time with the machine learning algorithm based on the plurality of features.

18. The system of claim 17, wherein calculating the saved time with the machine learning algorithm based on the plurality of features comprises:

calculating a first estimated time to fill out the form based on the first option;

calculating a second estimated time to fill out the form based on the second option; and calculating a difference between the first and second estimated times.

19. A system comprising:

a processor; and a non-transitory computer-readable medium storing instructions that, when executed by the processor, causes the processor to perform a method of quantifying saved time comprising:

causing an interface to be displayed on a user device, the interface comprising a first option for a user to manually enter data into a form and a second option to import or upload data into the form;
receiving user metrics information from a database;
receiving import and extraction statistical information from a data lake;
receiving identifying information for the form from the user device;
vectorizing features associated with the user;
assigning the vectorized features to a selected user cluster of a plurality of user clusters by analyzing the vectorized features;
calculating, via a machine learning algorithm, a time savings for using the second option based on the user metrics information, the import and extraction statistical information, the identifying information for the form, and the selected user cluster;
causing the calculated time savings to be displayed on the user device.

* * * * *